(12) United States Patent
Alvord et al.

(10) Patent No.: US 9,107,250 B2
(45) Date of Patent: Aug. 11, 2015

(54) METHOD OF OPERATING AN LED LIGHTING SYSTEM

(75) Inventors: Robert Alvord, Elmwood Park, IL (US); Jim Kopec, St. Charles, IL (US); Jochen Aicher, Reitheim-Weilheim (DE); Matthew Schwind, Lisle, IL (US)

(73) Assignee: Diehl AKO Stiftung & Co. KG, Wangen (DE)

( * ) Notice: Subject to any disclaimer, the term of this patent is extended or adjusted under 35 U.S.C. 154(b) by 62 days.

(21) Appl. No.: 13/849,979

(22) PCT Filed: Sep. 23, 2011

(86) PCT No.: PCT/US2011/052943
§ 371 (c)(1),
(2), (4) Date: Jun. 19, 2013

(87) PCT Pub. No.: WO2012/040566
PCT Pub. Date: Mar. 29, 2012

(65) Prior Publication Data
US 2013/0257314 A1   Oct. 3, 2013

Related U.S. Application Data

(60) Provisional application No. 61/385,797, filed on Sep. 23, 2010.

(51) Int. Cl.
H05B 41/06 (2006.01)
H05B 37/02 (2006.01)
H05B 33/08 (2006.01)

(52) U.S. Cl.
CPC ........ *H05B 37/0281* (2013.01); *H05B 33/0842* (2013.01); *G01K 2217/00* (2013.01)

(58) Field of Classification Search
CPC .......... H05B 33/0815; H05B 33/0818; H05B 33/0854
USPC .................. 315/291, 307, 309, 360, 294, 297
See application file for complete search history.

(56) References Cited

U.S. PATENT DOCUMENTS

| 7,420,335 B2 * | 9/2008 | Robinson et al. ............. 315/224 |
| 2003/0133491 A1 * | 7/2003 | Shih .............................. 374/163 |
| 2009/0079360 A1 * | 3/2009 | Shteynberg et al. .......... 315/291 |
| 2009/0079362 A1 * | 3/2009 | Shteynberg et al. .......... 315/294 |

(Continued)

OTHER PUBLICATIONS

Hulett et al, Measuring LED Junction Temperature, Photonics.com-Photonics Spectra, vol. 42, July Issue, Jul. 1, 2008.*

(Continued)

*Primary Examiner* — Thuy Vinh Tran
*Assistant Examiner* — Syed M Kaiser
(74) *Attorney, Agent, or Firm* — Laurence A. Greenberg; Werner H. Stemer; Ralph E. Locher

(57) ABSTRACT

An LED-based lighting system is operated with a time-based process. The LEDs are first turned on by energizing the system at full power. After a predetermined time period, which is selected so that the junction temperature of the LEDs does not reach a critical temperature, the current supply is ramped down to a steady-state supply. The steady-state current is maintained as long as the light is turned on. When the light is turned on the next time and the LEDs have not cooled down all the way, as determined by the time that has expired since the LEDs were last lit, the full-power time period is shortened accordingly.

5 Claims, 4 Drawing Sheets

(56) References Cited

U.S. PATENT DOCUMENTS

| | | | |
|---|---|---|---|
| 2009/0306912 A1* | 12/2009 | Chen et al. | 702/57 |
| 2010/0039046 A1* | 2/2010 | Roebke | 315/291 |
| 2010/0102773 A1* | 4/2010 | Lipcsei | 320/101 |
| 2011/0089830 A1* | 4/2011 | Pickard et al. | 315/32 |
| 2011/0115394 A1* | 5/2011 | Shteynberg et al. | 315/250 |
| 2011/0227490 A1* | 9/2011 | Huynh | 315/185 R |
| 2013/0257314 A1* | 10/2013 | Alvord et al. | 315/297 |

OTHER PUBLICATIONS

Hullet et al., "Measuring LED Junction Temperature", Photonics.com—Photonics Spectra, vol. 42, July Issue, Jul. 1, 2008 [retrieved Jan. 24, 2012], Retrieved from internet: http://www.photonics.com/Article/aspx?AID=34316; pp. 1-5.

* cited by examiner

FIG. 3
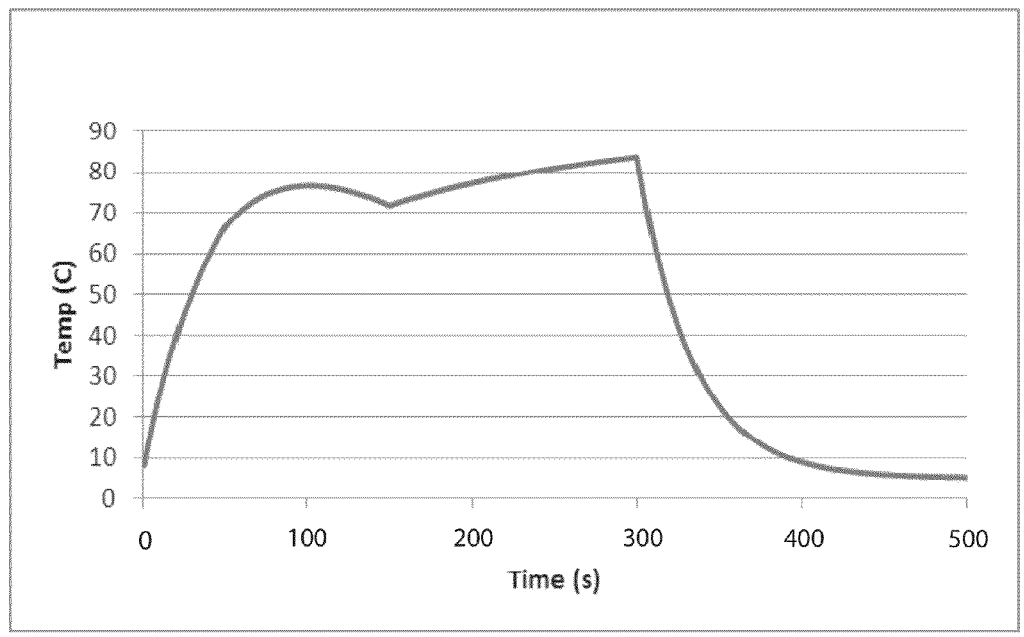
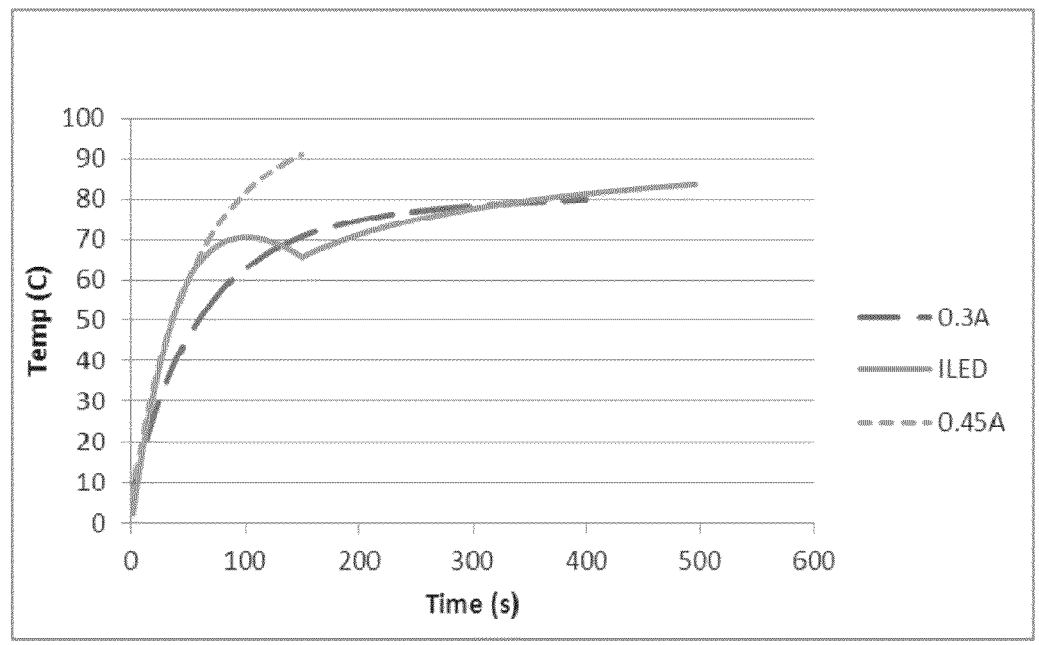
FIG. 4

METHOD OF OPERATING AN LED LIGHTING SYSTEM

CROSS-REFERENCE TO RELATED APPLICATION

This application is a continuation, under 35 U.S.C. §120, of copending international application No. PCT/US2011/052943, filed Sep. 23, 2011, which designated the United States; this application also claims the benefit, under 35 U.S.C. §119(e), of provisional patent application No. U.S. 61/385,797, filed Sep. 23, 2010; the prior applications are herewith incorporated by reference in their entirety.

BACKGROUND OF THE INVENTION

Field of the Invention

The invention relates to a method of operating an LED-based lighting system and, more specifically, to a lighting system for appliances such as refrigerators, freezers, washing machines, dryers, dish washers, ovens, cookers, and the like.

Light-emitting diodes (LEDs) are advantageously used in many modern lighting systems with a view to reduced energy consumption and heat radiation. While the LEDs of such lighting systems are cool to the touch—they do not produce heat in the form of IR radiation—they are subject to heat generation due to the inefficiency of the light-generating semiconductor processes. The heat, which is referred to as junction temperature, must be properly managed.

In lighting systems for refrigerators and similar appliances, the LED junction temperatures must be maintained below the critical temperature of 150° C. or below 125° C., depending on the type of LED. As the junction temperature rises, or the LEDs are driven in the vicinity or at the critical temperature, their light output decreases, their efficiency decreases, the output wavelength shifts (i.e., changes the light color), and their useful lifespan is shortened.

These problems are currently solved by implementing large heat sinks, by measuring the LED temperatures, and/or by dimming the LEDs as their temperature rises. These measures, of course, are disadvantageous in that large heat sinks are quite expensive and only limited installation space is available in many implementations, and in that real-time junction temperature measurements are very complicated and expensive to implement. In order to properly effect such protective measures, considerable effort must be expended with regard to the thermal time constancies information, microcontroller operations, and software. In many cases, also, the functionality of the corresponding appliance must be taken into account.

SUMMARY OF THE INVENTION

It is accordingly an object of the invention to provide a method of operating an LED-based lighting system which overcomes the above-mentioned disadvantages of the heretofore-known devices and methods of this general type and which is simplified and less expensive as compared with the prior art systems.

With the foregoing and other objects in view there is provided, in accordance with the invention, a method of operating an LED-based lighting system, the method which comprises:

energizing the LEDs for turning on the lighting system by supplying electrical current to the LEDs at a rated maximum power;

maintaining the maximum power for a predetermined time period, the predetermined time period representing a time period during which the LEDs may be driven at the rated maximum power without reaching a critical temperature for the junction temperature;

subsequently reducing the electrical current to a value at which the junction temperature of the LEDs does not further rise on continued use and maintaining the electrical current at the reduced value so that the LEDs will not reach the critical temperature.

In accordance with an added feature of the invention, the electrical current is reduced along a linear decrease. In order to render the ramp down imperceptible, the linear decrease may be effected during a time period that exceeds the time period at which the LEDs were driven at the rated maximum power.

In the alternative, it is possible to reduce the electrical current in a single step. Yet alternatively, the electrical current may be reduced in a plurality of steps, such as 2, 3, 4, 6, 8, or more steps.

The primary concept followed here is to control the temperature of the LEDs by a "simple" time based system. This then controls the reliability of the LED lighting system. The temperature rise of high powered LEDs has the potential to damage the device. Due to the fact that the drive power is directly related with the junction temperature of the LED, it is possible to control the temperature and minimize the size of the heat sink required by dimming the LED. A time based system can manage the dimming by ramping down the power after an initial full power interval to a steady state level.

If we know the ambient temperature and the thermal time constant of a heat sink and system, we can calculate the temperature versus time on and off. With a microcontroller we can easily calculate or use a look-up table to calculate a temperature. Setpoints for dimming the LEDs can be established based on this result. We may use 4, or 8, or 16, or more dimming steps with time to control the LED temperatures due to self-heating.

In accordance with a concomitant feature of the invention, upon a renewed turning on of the LEDs, an extinction time period is measured (e.g., counted down) from a last time the LEDs were turned off to an onset of a new turning on. The time period during which the LEDs are driven at the rated maximum power is then shortened in proportion with a length of the extinction time period. The proportion, by way of example may be, say, a 1:10 relationship (i.e., 60 seconds full power vs. 10 minutes assumed extinction time for full cooldown).

In other words, upon turn-off, it is possible to perform a reverse calculation, assuming no loading. In this way if the LED was turned on before it was completely cooled off (−10 minutes), we could still control the temperature.

A further factor for starting is to determine whether or not the refrigerator is on already cold. Again, a simple calculation or look-up table is used to solve this issue.

With the invention, it is possible to avoid having to implement the prior art solutions of using large expensive heat sinks and/or direct closed loop control with thermostats and real-time measurements.

That is, it is primarily important and thus a major advantage of this invention that we eliminate the need for thermistors and measurements and also eliminate the need for a connection from a microcontroller to a remote LED board.

As a rule of thumb, the primary factors influencing the junction temperature are the ambient temperature and the drive current. In addition, the type of light output is important, namely, whether the light is pulsed or continuous, and the LED wattage per unit of heat sink (typically unit area) for dissipating the heat.

Other features which are considered as characteristic for the invention are set forth in the appended claims.

Although the invention is illustrated and described herein as embodied in a method for operating an LED lighting system, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE SEVERAL VIEWS OF THE DRAWING

FIG. 3 is a diagram showing the temperature response of an LED to the drive current of FIG. 2;

FIG. 4 is a diagram illustrating the temperature response to the drive current ILED that is ramped down, as in FIG. 2, but then retained at the lower level for the remainder, and also showing the temperature response to two comparative currents;

DETAILED DESCRIPTION OF THE INVENTION

Figure 1:
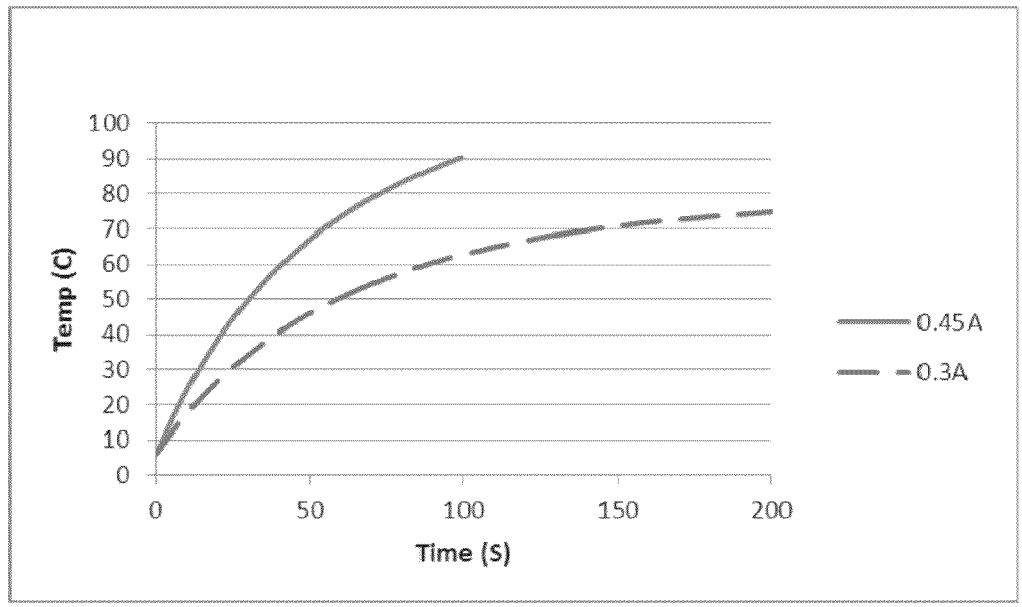
FIG. 1 is a graph illustrating junction temperature over time of an LED driven at two different drive currents, i.e., at different power levels.

Referring now to the figures of the drawing in detail and first, particularly, to FIG. 1 thereof, there is shown the temperature rise behavior of a 1 W LED with no substrate driven at 0.45 Amps. After only 70 seconds at full power the device has reached a critical temperature. At this rate the temperature would rise to 120 C if, of course, the device does not fail catastrophically before that. Because of this temperature behavior, it is clear that the LED should be provided with a large, and expensive, heat sink so that the heat may be properly dissipated.

An alternative approach is to use a lower power so that the junction temperature does not reach a critical temperature (dashed curve). However, since the lumen output of an LED is directly proportional to the drive power, the lighting system would require more LEDs to output the same illumination. Either solution, therefore, translates to higher cost by the inclusion of large heat sinks or the use of more LEDs.

FIG. 1 also makes clear that with no heat sink, we have about 60 seconds at which we can use full power without damaging the device. After 60 seconds, the device may still be used (i.e., if the lighting system is still required to be on) if the power is ramped down before the critical temperature is reached.

We know of an additional parameter that applies to refrigerators: The maximum period of time, on average, which most users open the refrigerator door is approximately 60 seconds. This applies to, say, 95% of users. A typical exception to this is when the refrigerator is being cleaned. One may safely assume, however, that the user has external lighting available during cleaning and would turn off the refrigerator during extended periods of cleaning. That is, it is a proper setting that we would run lowest cost LED lighting for up to 60 seconds and then dim the light output.

It is also possible to incorporate a flashing sequence prior to dimming, to invite the user to close the door. This may be useful, for instance, when children search for food or forget to close the door. A further feature that may be incorporated is an audible sound enunciator.

According to the invention, the current $I_{LED}$ to the device may be controlled as follows:

$$I_{LED} = \begin{cases} I_{MAX} & t < t_{limit} \\ I_{MAX} - (I_{MAX} - I_{Limit}) * \left(\dfrac{t - t_{limit}}{t_{RD}}\right) & t_{limit} < t < t_{limit} + t_{RD} \\ I_{Limit} & t > t_{limit} + t_{RD} \end{cases} \quad (1)$$

Figure 2:
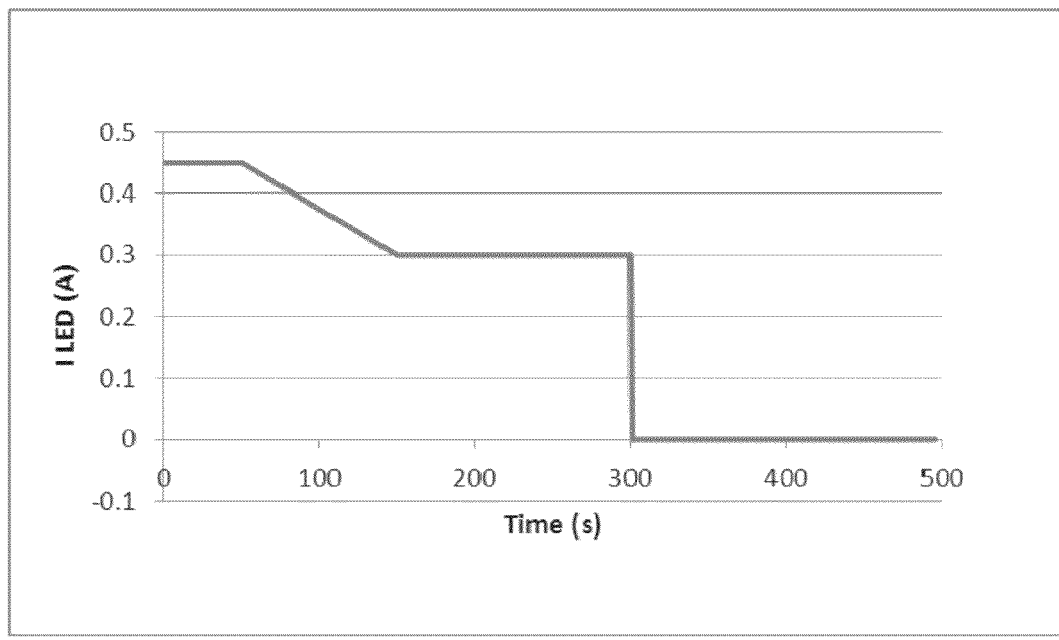
FIG. 2 is a diagram showing an exemplary drive current.

That is, the current $I_{LED}$ to the device is controlled by the equation that defines three different time periods. A maximum current ($I_{MAX}$) is used until the limit time ($t_{limit}$) is reached. At that point the current is ramped down linearly during a ramp down time ($t_{RD}$) to the limit current ($I_{limit}$). After the ramp down phase the current is maintained at the limit current for the remainder, until the light is turned off altogether. This process is shown in FIG. 2. There, $t_{limit}$ lies at 60 seconds and $t_{RD}$ extends for about 180 seconds. Thereupon the current is maintained at 0.3 A until it is terminated altogether at the 300 second mark. The corresponding temperature response is illustrated in FIG. 3.

FIG. 4 shows the temperature response curves for comparative current 0.45 A (full power) and dimmed lighting current 0.3 A in comparison with a current $I_{LED}$. The latter corresponds to the current of FIG. 2, except it is not turned off at 300 seconds.

It will be understood that, instead of a single, linear dimming ramp, we may also use a plurality of discrete steps for the dimming operation. As mentioned above, we may use 4, or 6, or 8, or more dimming steps in order to ramp down the current. In that case, the dimming of the LEDs may or may not be noticeable.

Figure 6:
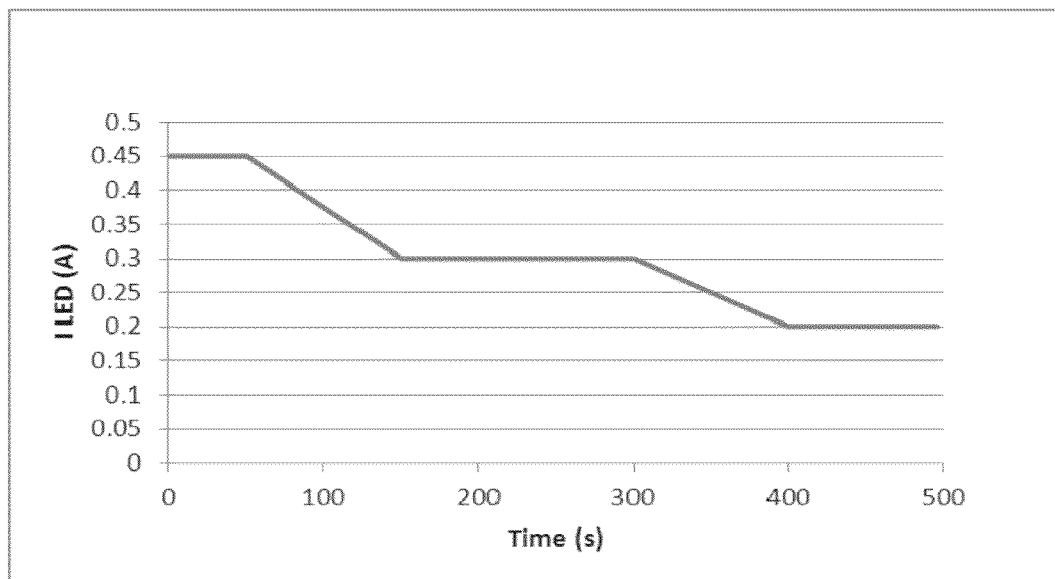
FIG. 6 is a current intensity graph showing a gradual ramp-down in several steps, each done with a hold time.
Figure 7:
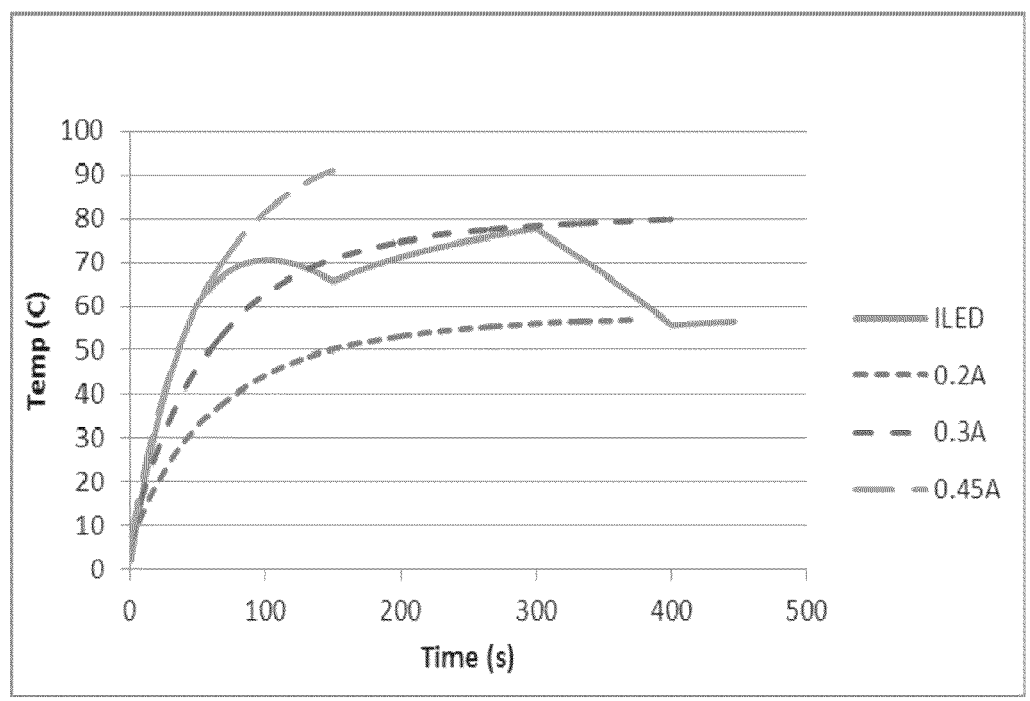
FIG. 7 illustrates the temperature responses of a variety of comparative current levels and the resulting temperature response of the stepwise ramp-down of the current in FIG. 6.

FIGS. 6 and 7 illustrate an alternative power ramp-down and a corresponding temperature behavior of the LED-based lighting system. Here, the current is linearly reduced from the full power level at 0.45 A down to 0.3 A, then it is retained for some 130 seconds, or so, before the current is further ramped down along a linear decrease to, say, 0.2 A, which is held for the remaining time. The corresponding temperature behavior of the junction temperature appears in FIG. 7 at curve identified with the label ILED.

An even simpler algorithm, as represented in the following equation (2) may be incorporated in small low cost microcontrollers with no calculations in the controller.

$$I_{LED} = \begin{cases} I_{MAX} & t < t_{limit\_1} \\ I_{Limit\_1} & t_{limit\_1} < t < t_{limit\_2} \\ I_{Limit\_2} & t > t_{limit\_2} \end{cases} \quad (2)$$

Figure 5:
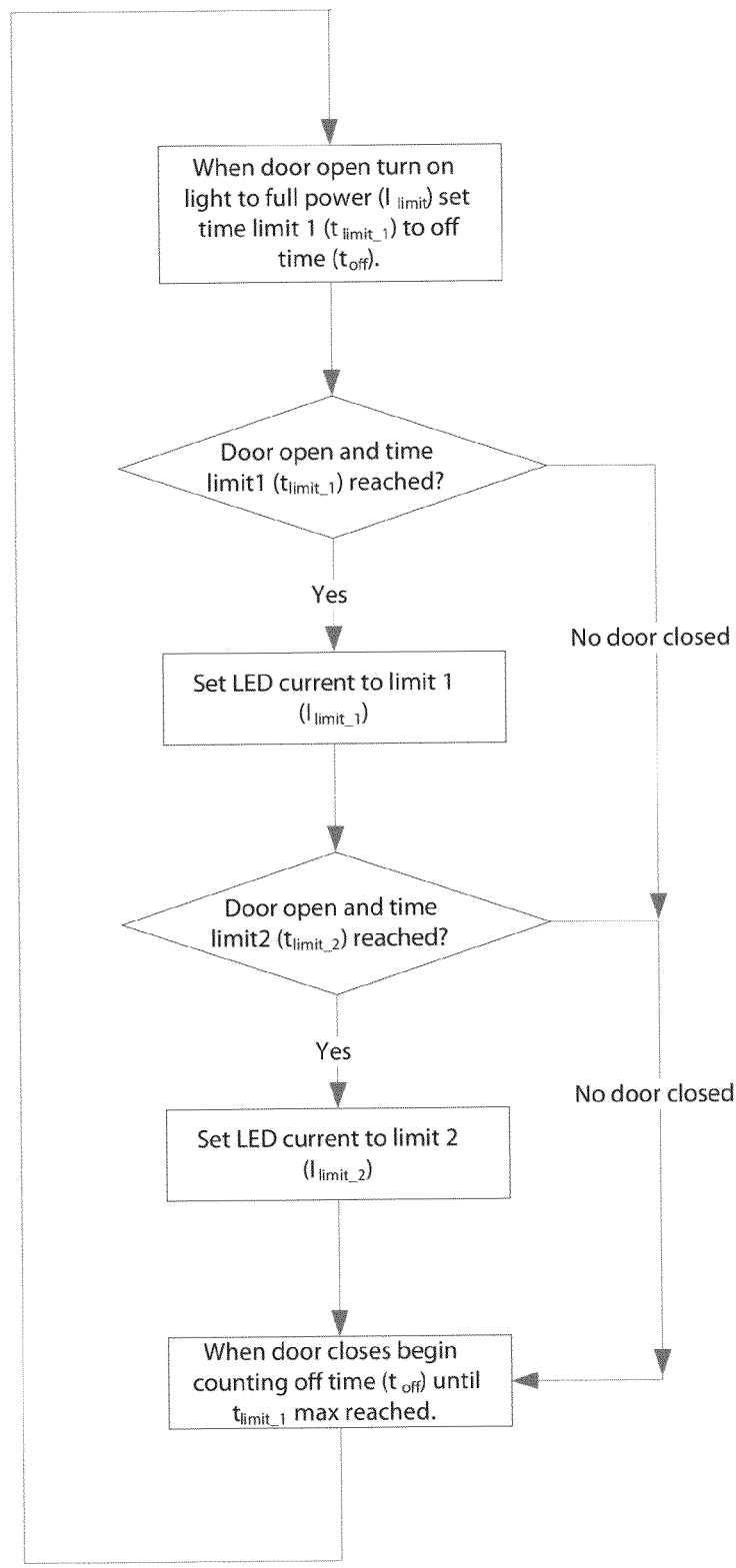
FIG. 5 is a flow chart illustrating a command sequence according to the invention for energizing an LED lighting system in a refrigerator.

Equation (2) represents a two-step method for simple control. This process follows the flow-chart of FIG. 5. The advantage is that this could be controlled by simple digital outputs. A disadvantage of this process is that the dimming will be very obvious and the "lower brightness" period is entered much earlier and quite abruptly. The more complicated process as represented by equation (1) would result in a near imperceptible dimming and the LED would be producing more light for a longer period of time.

$I_{MAX}$, $I_{Limit}$ and $t_{RD}$ are constants that are set by the LED and the amount of heat sink used. This is the case for both equations (1) and (2). The parameter $t_{limit}$ or $t_{limit\_1}$ varies based on the last time the LED was turned on, but its max limit is determined by the LED and the amount of heat sink. This is due to the residual heat left in the device after the LED was last switched off. A good approximation for $t_{limit}$ is to set it equal to the time since the LED was last turned on up to its max limit. For example if the LED is turned on 20 seconds after the last shut off, then $t_{limit}$ would be 20 seconds. If the LED is turned on 90 seconds after the last shut off, and $t_{limit}$ max is 50 seconds. Then $t_{limit}$ would be 50 seconds.

The invention claimed is:

1. A method of operating an LED-based lighting system with a plurality of LEDs, the method which comprises:
    energizing the LEDs for turning on the lighting system by supplying electrical current to the LEDs at a rated maximum power;
    maintaining the energization of the LEDs at the rated maximum power for a predetermined time period, the predetermined time period representing a time period during which the LEDs is allowed to be driven at the rated maximum power without reaching a critical temperature for a junction temperature;
    subsequently reducing the electrical current to a reduced value at which the junction temperature of the LEDs does not further rise on continued use and maintaining the electrical current at the reduced value so that the LEDs will not reach the critical temperature;
    subsequently turning off the LEDs;
    upon a renewed turning on of the LEDs, measuring an extinction time period that is defined as a period from a last time the LEDs were turned off to an instant at which the LEDs are turned on again; and
    shortening the time period during which the LEDs are driven at the rated maximum power in proportion with a length of the measured extinction time period.

2. The method according to claim 1, which comprises reducing the electrical current along a linear decrease during a time period that exceeds the time period at which the LEDs are allowed to be driven at the rated maximum power.

3. The method according to claim 1, which comprises reducing the electrical current in a single step.

4. The method according to claim 1, which comprises reducing the electrical current in a plurality of steps.

5. The method according to claim 1, which comprises gradually reducing the electrical current along a linear decrease for a given time period, holding the current at an intermediate level for a given time period, further decreasing the current along a linear decrease for a given time period, and again holding the current at a further reduced level.

* * * * *